United States Patent [19]

Sheng et al.

[11] Patent Number: 4,614,657

[45] Date of Patent: Sep. 30, 1986

[54] DIPEPTIDE SWEETENED READY-TO-EAT CEREAL AND COATING METHOD

[75] Inventors: Yung-Bool D. Sheng, Hanover Park; Warren A. Widicus, Bartlett, both of Ill.

[73] Assignee: The Quaker Oats Company, Chicago, Ill.

[21] Appl. No.: 649,518

[22] Filed: Sep. 11, 1984

[51] Int. Cl.$^4$ ............................................. A23L 1/34
[52] U.S. Cl. .................................... 426/96; 426/303; 426/620; 426/103; 426/548
[58] Field of Search ............... 426/93, 548, 302.3, 426/620, 96, 103, 804

[56] References Cited

U.S. PATENT DOCUMENTS 3,934,047  1/1976  Schade ............................ 426/548
4,031,259  6/1977  Lugay ............................. 426/804
4,378,377  3/1983  Gajewski ........................ 426/548

Primary Examiner—Raymond N. Jones
Assistant Examiner—Elizabeth A. King
Attorney, Agent, or Firm—Daniel W. Latham

[57] ABSTRACT

A sweet, coated, ready-to-eat cereal and a method for making the sweet, coated, ready-to-eat cereal where the coated ready-to-eat cereal comprises: (a) a ready-to-eat cereal base; (b) a dipeptide sweetener in an amount in the range of about 0.05% to 0.5% of the weight of the ready-to-eat cereal base; and (c) an edible acid selected from the group consisting of mono-, di- and tri-carboxylic acids which have at least one $pK_a$ in the range of about 3.0 to 6.0, wherein the dipeptide sweetener and the edible acid are intermingled in a coating on the ready-to-eat cereal base.

12 Claims, No Drawings

DIPEPTIDE SWEETENED READY-TO-EAT CEREAL AND COATING METHOD

BACKGROUND

In the manufacture of sweetened ready-to-eat cereals, sweet coatings are commonly applied to a cereal base material, especially coatings containing the sugar sucrose.

Although sucrose has excellent organoleptic properties in cereal coating applications, it is well known that the large amounts of sucrose consumed in the typical American's diet contributes to obesity and dental caries. A recognition of this fact among consumers has led to intensive efforts in the food industry to find sweeteners to replace sucrose in many food products. One of the most successful approaches has been to replace sucrose with dipeptide sweeteners, especially sweeteners based on the amino acid L-aspartic acid. The most commercially successful of this group has been L-aspartyl-L-phenylalanine methyl ester, also known as aspartame, a sweetener approximately 200 times as sweet as sucrose and which has similar sweetness characteristics.

Incorporation of dipeptide sweeteners in food coatings is not, however, a matter of simple replacement of sucrose. Characteristic differences between dipeptide sweetners and sucrose include reduced bulk due to its high sweetening power, instability of the sweetener molecule when incorporated in many foods and its high cost. In particular, aspartame is known to be unstable in the presence of moisture; hydrolysis of the dipeptide bond, hydrolysis of the methyl ester group and/or cyclization to diketopiperazine can occur, all which destroy the sweetness of the aspartame molecule. Further, since aspartame is an aspartic acid based dipeptide, it has a free amine group available for browning reactions with the reducing sugars present in many foods; reactions which can reduce the sweetness and change the flavor of the food product during processing and storage.

Many known methods for coating a ready-to-eat cereal with dipeptide sweeteners apply a dipeptide sweetener such as aspartame to the ready-to-eat cereals in an aqueous solution together with bulking and texture improving agents such as dextrins or vegetable protein. These coating methods have a number of disadvantages. First, during processing and long term storage of comestibles coated with aspartame, contact of the free amine group of aspartame with reducing groups present in any dextrins or reducing sugars in the ready-to-eat cereal can cause a browning reaction which reduces the sweetness of the product, causes the formation of brown reaction products on the product surface and causes the formation of the typical flavor elements of browning reactions. Second, since a slight delay in sweetness may be detected in aspartame sweetened products by some persons, incorporating aspartame in a dextrin or vegetable protein coating may further reduce or delay the sweetness impact of aspartame. Third, due to the instability of aspartame in water, applying aspartame to the ready-to-eat cereal in aqueous solution or suspension may cause substantial degradation of aspartame during the application and drying process.

It is therefore an object of the present invention to provide a method for making a sweet, coated ready-to-eat cereal in which the dipeptide sweetener is stable during applition.

It is also an object of the present invention to provide a sweet, coated ready-to-eat cereal in which the dipeptide sweetener remains stable when in contact with a ready-to-eat cereal base containing reducing sugars.

It is also an object of the present invention to provide a sweet, coated ready-to-eat cereal with a strong sweetness impact.

SUMMARY OF THE INVENTION

These and other objects are provided by the coated ready-to-eat cereal and coating method of the present invention. We have discovered a stable, sweetener coated ready-to-eat cereal comprising:

(a) a ready-to-eat cereal base;
(b) a dipeptide sweetener in an amount in the range of about 0.05% to 0.5% of the weight of the ready-to-eat cereal base; and
(c) an edible acid selected from the group consisting of mono- di-, and tri-carboxylic acids which has at least one $pK_a$ in the range of about 3.0 to 6.0 in an amount of at least the amount determined by the formula $$W_A = .25 \times \frac{MW_A \times W_{DS}}{MW_{DS} \times N_A}$$

where $W_A$ is the weight % of acid on the ready-to-eat cereal, $W_{DS}$ is the weight of dipeptide sweetener on the ready-to-eat cereal, $MW_A$ is the molecular weight of the acid, $MW_{DS}$ is the molecular weight of the dipeptide sweetener and $N_A$ is the number of hydrogens in the acid with $pK_a$'s in the range of about 3.0 to 6.0, wherein the dipeptide sweetener and the edible acid are intermingled in a coating on the ready-to-eat cereal base.

We have also discovered a method for applying a sweet coating to a ready-to-eat cereal base comprising the steps of:

(a) admixing an aqueous sweetener solution comprising about 1.0% to 10.0% of a dipeptide sweetener together with an edible acid selected from the group consisting of mono-, di- and tri-carboxylic acids which has at least one $pK_a$ in the range of about 3.0 to 6.0 in an amount of acid of at least the amount determined by the formula $$W_A = .25 \times \frac{MW_A \times W_{DS}}{MW_{DS} \times N_A}$$

where $W_A$ is the weight % of acid in the solution, $W_{DS}$ is the weight % of dipeptide sweetener in the solution, $MW_A$ is the molecular weight of the acid, $MW_{DS}$ is the molecular weight of the dipeptide sweetener and NA is the number of hydrogens in the acid with $pK_a$'s in the range of about 3.0 to 6.0;

(b) applying the sweetener solution to a ready-to-eat cereal base in an amount sufficient to provide a coating of dipeptide sweetener in an amount in the range of about 0.05% to 0.5% based on the weight of the ready-to-eat cereal base; and (c) drying the sweetened ready-to-eat cereal base.

DETAILED DESCRIPTION OF THE INVENTION

The stable, sweetener coated ready-to-eat cereal of the present invention comprises a dipeptide sweetener and an edible acid on a ready-to-eat cereal base.

The dipeptide sweetener employed in the present invention can be any of the known low calorie nutritive sweeteners based on the L-aspartic acid dipeptide configuration that have a free amine group. A preferred dipeptide sweetener is L-aspartyl-L-phenylalanine methyl ester, also known as aspartame.

The edible acid employed in the present invention is a weak edible acid. Thus, the acid can be weak organic acids such as edible mono-, di-and tri-carboxylic acids which have at least one $pK_a$ value in the range of about 3.0 to 6.0. For example, ascorbic acid, citric acid, fumaric acid, tartaric acid, malic acid and lactic acid can be used.

The ready-to-eat cereal base to which the sweet coating of the present invention is applied can be made with any cereal grain or cereal grain flour. Typically, such a cereal base contains reducing sugars. By reducing sugars is meant the readily oxidized aldoses such as fructose, glucose, maltose, galactose, lactose, invert sugar and the like. These reducing sugars are available to react with the free amine group of dipeptide sweeteners in reactions which could reduce the sweetness of the product during its processing or long term storage.

The ready-to-eat cereal base is typically flaked, gun puffed oven puffed, extruded or otherwise shaped or expanded to a desired shape and size, coated with any other desired materials to enhance and maintain its texture and appearance and then dried to a moisture level at which it is structurally stable.

Other reducing sugars present in the ready-to-eat cereal base can be in the form of dextrins or sugars added to the cereal base. For example, the shaped ready-to-eat cereal base preferably has a dextrin coating in an amount in the range of about 10% to 60% of the weight of the cereal base which provides a desired texture improvement. Aside from any reducing sugars that may be present in the cereal material itself, the dextrin coating then contains reducing sugars that can react with the dipeptide sweetener as heretofore described. Typically, the dextrin employed in such a texture improving coating has a dextrose equivalent (D.E.) value (a measure of reducing sugar content) in the range of about 5 to 50 although no particular maximum or minimum D.E. value can be said to be critical to the texture improvement or essential to the operability of the present invention.

While we do not wish to be bound by theories, we believe that the success of the present invention in inhibiting the reaction between reducing sugars and the dipeptide sweetener is the result of the protonation of the free amine group of the dipeptide sweetener the lower pH provided by the acid. Usually, a compound having a primary amine such as an amino acid can react with the carbonyl group of a reducing sugar in a reaction which provides water and an addition product known as a Schiff's base. The Schiff's base tends to be unstable and either polymerizes or further reacts with additional amines to give more complex products such as the brown polymers and breakdown products familiar to those skilled in the art as those responsible for the non-enzymatic browning of foods. It is well known, however, that the reaction forming the Schiff's base is reversible by an acid hydrolysis reaction in which the protonated imine becomes susceptible to nucleophilic attack by water which then drives the chemical equilibrium away from the formation of the Schiff's base and back toward the reducing sugar and amine. We believe that by employing a weak acid to maintain a low but relatively constant acidity on the cereal base, the free amine group of the dipeptide sweetener will be protonated, the formation of the Schiff's base from reducing sugars in the cereal base will be inhibited, and the sweetness of the product will be preserved during the manufacture of the sweetened product (especially in processing steps employing heat and moisture) and also during long term storage of the product.

In the coated ready-to-eat cereal of the present invention, therefore, the dipeptide sweetener and edible acid are intermingled in a coating on the ready-to-eat cereal base such that the acid environment provided to the dipeptide sweetener inhibits reactions between reducing sugars in the ready-to-eat cereal base and the dipeptide sweetener.

Although the coated ready-to-eat cereal of the present invention, as heretofore described, is not inherently limited to any particular amount of dipeptide sweetener on the ready-to-eat cereal base, the dipeptide sweetener's relatively high cost and also its relatively great sweetening power, as a practical matter, provides the limit for the amount of dipeptide sweetener to be applied. Therefore, a range of about 0.05% to 0.5% of dipeptide sweetener on the ready-to-eat cereal base is preferred to provide an adequately sweet product, with the percentage based on the ratio of the weight of the dipeptide sweetener to the weight of the ready-to-eat cereal base. A most preferred range for ready-to-eat cereals is about 0.10% to 0.35% of the dipeptide sweetener.

The coated ready-to-eat cereal of the present invention can also not be said to be inherently limited to any particular amount of acid since the $pK_a$, molecular weights and molecular structures of the various acids will necessarily differ. However, sufficient acid must be present to protonate a significant amount of the free amine groups on the dipeptide sweetener. Therefore, an effective amount of acid sufficient to protonate at least about 25% of the amine groups is preferred. This amount can be determined by the formula $$W_A = .25 \times \frac{MW_A \times W_{DS}}{MW_{DS} \times N_A}$$

where $W_A$ is the weight % of acid on the ready-to-eat cereal, $W_{DS}$ is the weight % of dipeptide sweetener on the ready-to-eat cereal, $MW_A$ is the molecular weight of the dipeptide sweetener and $N_A$ is the number of hydrogens in the acid with $pK_a$'s in the preferred range of 3.0 to 6.0. For example, if the acid were citric acid and about 0.25% aspartame was on the ready-to-eat cereal, at least about 0.014% of citric acid would be preferred in the present invention. Most preferably, an amount of acid sufficient to protenate about 100% of the amine group is preferred.

A method for making the coated ready-to-eat cereal by applying a sweet coating comprises the steps of admixing the dipeptide sweetener and the edible acid in an aqueous sweetener solution, applying the admixed sweetener solution onto a ready-to-eat cereal base and drying the sweetened ready-to-eat cereal base.

The dipeptide sweetener and edible acid are first admixed with water to make an aqueous sweetener solution. To minimize the need for subsequent drying of the product, it can be desirable to give the solution a high concentration of dipeptide sweetener. Due to the poor solubility of dipeptide sweetener near its isoelectric point (at aspartame's isoelectric point of pH 5.2, its solubility is less than about 1%) it is preferred to admix and maintain the solution at elevated temperatures in order to make a more concentrated solution.

The highest concentration of dipeptide sweetener is not, however, critical or even always desirable in the operation of the present invention. Dipeptide sweetener concentrations as low as about 1% can also be used effectively. Preferably, a solution with a pH in the range of about 3.0 to 5.0 and a concentration of dipeptide sweetener in the range of about 3.0% to 4.5% can be maintained in solution at a temperature in the range of about 50° C. to 75° C. when an amount of acid of at least the amount specified by the formula $$W_A = .25 \times \frac{MW_A \times W_{DS}}{MW_{DS} \times N_A}$$

is used, where $W_A$ is the weight % of acid in the solution, $W_{DA}$ is the weight % of dipeptide sweetener in the solution, $MW_A$ is the molecular weight of the acid, $MW_{DS}$ is the molecular weight of the dipeptide sweetener and $N_A$ is the number of hydrogens in the acid with $pK_a$'s in the preferred range of about 3.0 to 6.0.

The aqueous solution is then applied onto the comestible base so that the solution coats the ready-to-eat cereal base. A fine spray or mist of the sweetener solution can produce this coating. No special equipment is required to provide the fine spray; conventional spraying equipment of the type typically used for spraying moderately viscous liquids can be used. A sufficient amount of solution is applied to provide a coating of dipeptide sweetener in an amount in the preferred range of about 0.05% to 0.5% based on the weight of the ready-to-eat cereal base. To keep the dipeptide sweetener in solution, the solution can be sprayed at a suitable elevated temperature. In spraying the ready-to-eat cereal base, the spray is preferably applied to a tumbling bed of ready-to-eat cereal base pieces to promote an even distribution of dipeptide sweetener.

The sweetened ready-to-eat cereal base is then dried. Conventional drying apparatus such as, for example, conveyor type drying ovens can be used. Oven drying typically proceeds at temperatures in the range of about 90° C. to 170° C. and preferably in the range of about 120° C. to 140° C. for a duration in the range of about 30 seconds to to 5 minutes, which leaves a ready-to-eat cereal product with a moisture content suitable for packaging; typically less than about 5% moisture and preferably less than about 3% moisture.

In a preferred embodiment, the ready-to-eat cereal base is coated with a dextrin coating layer prior to coating with the sweetener solution. Preferably a solution comprising about 20% to 65% dextrin is sprayed onto the comestible base and then dried to a moisture content at which the comestible base is structurally stable. A moisture content of less than about 10% is satisfactory. The sweetener coating can then be applied in the manner heretofore described.

The following examples illustrate and explain the present invention but are not to be taken as limiting the present invention in any regard.

EXAMPLE 1

Sugar Free Ready to Eat Cereal

Take 200 gram of a highly expanded, sugar free, extruded cereal base and enrobe the cereal base in a conventional tumbling bed enrober with 170 grams of a sugar free syrup containing:

| | |
|---|---|
| 15 D.E. Malto dextrin | 53% |
| Coconut oil | 20.5% |
| Salt | 1.7% |
| Water | 24.8% |

Dry the enrobed cereal base to a moisture content of about 3% in a conventional drying oven.

Prepare an aspartame solution by acidifying about 25 grams of water with 1 ml of 1M citric acid, heating the solution to about 150° F. and then dissolving 0.9 grams of aspartame into the heated solution.

While maintaining the aspartame solution at about 150° F., spray the solution onto the cereal base in a fine mist. Dry the sprayed cereal in a conventional drying oven to a moisture content of about 3%.

EXAMPLE 2

Ready to Eat Cereal With Fructose

Take 200 grams of a highly expanded, extruded cereal base and enrobe the cereal base in a conventional tumbling bed enrober with 170 grams of a syrup containing:

| | |
|---|---|
| High Fructose Corn Syrup | 25% |
| 15 D.E. Malto dextrin | 28% |
| Coconut oil | 20.5% |
| Salt | 1.7% |
| Water | 24.8% |

Dry the enrobed cereal base to a moisture content of about 3% in a conventional drying oven.

Following the method described in Example 1, prepare about 27 grams of a sweetener solution with 0.75 grams of dissolved aspartame and 1 ml. of 1M citric acid in water and spray and dry the cereal base.

EXAMPLE 3

Puffed Ready to Eat Cereal

Use the method described in Example 1 except that in place of the extruded cereal base, use a puffed wheat or puffed rice cereal.

EXAMPLE 4

Granola Cereal

Take 2000 grams of a base mix containing:

| | |
|---|---|
| Oat flakes | 60% |
| Wheat flakes | 30% |
| Diced almond | 5% |
| Whey and soy blend | 5% | and enobe the base mix in a conventional tumbling bed enrober with 1000 grams of a syrup containing:

| | |
|---|---|
| High fructose corn syrup | 20% |
| 15 D.E. Malto dextrin | 20% |
| Coconut oil | 25% |
| Water | 35% |

Bake and dry the enrobed base mix at 260° F. for 10 minutes.

Prepare an aspartame solution by first acidifying about 95 grams of water with 3 ml of 1M citric acid, heating the solution to about 150° F. and then dissolving 2.65 grams of aspartame into the heated solution.

While maintaining the aspartame solution at about 150° F., spray the solution onto the enrobed base mix in a fine mist. Dry the spray cereal in a conventional drying oven.

Although the above description and examples of the invention are disclosed herein for the purpose of describing the invention to those with ordinary skill in the art, each and every modification and variation of the invention is not described in detail. It is intended, however, that all modifications and variations within the scope of the claims are to be included within the scope of the invention.

We claim:

1. A stable, sweet coated ready-to-eat cereal comprising:
   (a) a ready-to-eat cereal base having a dextrin coating;
   (b) a dipeptide sweetener in an amount in the range of about 0.05% to 0.5% of the weight of the ready-to-eat cereal base; and
   (c) an edible acid selected from the group consisting of mono-, di- and tri-carboxylic acids which have at least one $pK_a$ in the range of about 3.0 to 6.0 in an amount of acid (as determined by the following formulas) in the range of about $$W_A = .25 \times \frac{MW_A \times W_{DS}}{MW_{DS} \times N_A}$$

to about $$W_A = 1.00 \times \frac{MW_A \times W_{DS}}{MW_{DS} \times N_A}$$

where $W_A$ is the weight % of acid on the ready-to-eat cereal, $W_{DS}$ is the weight % of dipeptide sweetener on the ready-to-eat cereal, $MW_A$ is the molecular weight of the dipeptide sweetener and $N_A$ is the number of hydrogens in the acid with $pK_a$'s in the range of about 3.0 to 6.0, wherein the dipeptide sweetener and the edible acid are intermingled in a coating on the ready-to-eat cereal base.

2. The ready-to-eat cereal of claim 1 wherein the ready-to-eat cereal base has a dextrin coating with a dextrose equivalent value in the range of about 5 to 50.

3. The ready-to-eat cereal of claim 1 wherein the ready-to-eat cereal base has a dextrin coating in an amount in the range of about 10% to 60% of the weight of the ready-to-eat cereal base.

4. The ready-to-eat cereal of claim 1 wherein the dipeptide sweetener is L-aspartyl-L-phenylalanine methyl ester.

5. The ready-to-eat cereal of claim 1 wherein the edible acid is selected from the group consisting of ascorbic acid, citric acid, fumaric acid, tartaric acid, malic acid and lactic acid.

6. A method for applying a sweet, stable coating to make a ready-to-eat cereal product comprising the steps of:
   (a) applying an aqueous dextrin solution to a ready-to-eat cereal base;
   (b) drying the dextrin coated ready-to-eat cereal base to a moisture content at which it is structurally stable;
   (c) admixing an aqueous sweetener solution comprising about 1.0% to 10.0% of a dipeptide sweetener together with an edible acid selected from the group consisting of mono-, di-, and tri-carboxylic acids which has at least one $pK_a$ in the range of about 3.0 to 6.0 in am amount of acid (as determined by the following formulas) in the range of about $$W_A = .25 \times \frac{MW_A \times W_{DS}}{MW_{DS} \times N_A}$$

to about $$W_A = 1.00 \times \frac{MW_A \times W_{DS}}{MW_{DS} \times N_A}$$

where $W_A$ is the weight % of acid in the solution, $W_{DS}$ is the weight % of dipeptide sweetener in the solution, $MW_A$ is the molecular weight of the acid, $MW_{DS}$ is the molecular weight of the dipeptide sweetener and $N_A$ is the number of hydrogens in the acid with $pK_a$'s in the range of about 3.0 to 6.0,
   (d) applying the sweetener solution to the dried, dextrin coated read-to-eat cereal base in an amount sufficient to provide a coating of dipeptide sweetener in an amount in the range of about 0.05% to 0.5% based on the weight of the ready-to-eat cereal base; and
   (e) drying the sweetened ready-to-ear cereal base.

7. The method of claim 6 wherein the aqueous dextrin solution has a dextrin concentration in the range of about 20% to 65%.

8. The method of claim 6 wherein the dextrin has a dextrose equivalent value in the range of about 5 to 50.

9. The method of claim 6 wherein sufficient dextrin solution is applied to provide a dextrin content in the cereal base of about 10% to 60%.

10. The method of claim 6 wherein the dipeptide sweetener comprises about 3.0% to 4.5% of the sweetener solution.

11. The method of claim 6 wherein the dextrin coated ready-to-eat cereal base is dried to a moisture content of less than, about 10%.

12. The method of claim 6 wherein the sweetened ready-to-eat cereal base is dried to a moisture content of less than about 5%.

* * * * *